(12) United States Patent
Otake et al.

(10) Patent No.: US 9,256,180 B2
(45) Date of Patent: Feb. 9, 2016

(54) IMAGE DISPLAY APPARATUS, DISPLAY CONTROL METHOD, AND NON-TRANSITORY COMPUTER-READABLE RECORDING MEDIUM ENCODED WITH DISPLAY CONTROL PROGRAM

(71) Applicants: Toshihiko Otake, Chiyoda-ku (JP); Hidetaka Iwai, Chiyoda-ku (JP); Kazumi Sawayanagi, Chiyoda-ku (JP); Toshikazu Kawaguchi, Chiyoda-ku (JP); Masayuki Kawamoto, Chiyoda-ku (JP)

(72) Inventors: Toshihiko Otake, Chiyoda-ku (JP); Hidetaka Iwai, Chiyoda-ku (JP); Kazumi Sawayanagi, Chiyoda-ku (JP); Toshikazu Kawaguchi, Chiyoda-ku (JP); Masayuki Kawamoto, Chiyoda-ku (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 441 days.

(21) Appl. No.: 13/630,653

(22) Filed: Sep. 28, 2012

(65) Prior Publication Data
US 2013/0082960 A1    Apr. 4, 2013

(30) Foreign Application Priority Data

Sep. 30, 2011  (JP) .................................. 2011-217417

(51) Int. Cl.
G09G 5/00 (2006.01)
G03G 15/00 (2006.01)
G06T 3/40 (2006.01)

(52) U.S. Cl.
CPC .......... *G03G 15/502* (2013.01); *G03G 15/5087* (2013.01); *G06T 3/40* (2013.01)

(58) Field of Classification Search
USPC .......................................... 345/660, 670, 371
See application file for complete search history.

(56) References Cited

U.S. PATENT DOCUMENTS

| 5,781,244 | A | | 7/1998 | Hirose et al. |
| 5,845,011 | A | * | 12/1998 | Miyamoto et al. ............ 382/232 |
| 8,514,252 | B1 | * | 8/2013 | Oplinger ....................... 345/661 |
| 8,570,346 | B2 | * | 10/2013 | Mikawa ........................ 345/661 |
| 2008/0136942 | A1 | * | 6/2008 | Yoon et al. ............... 348/231.99 |
| 2010/0066861 | A1 | | 3/2010 | Sakagami |

FOREIGN PATENT DOCUMENTS

| JP | 6-86130 A | 3/1994 |
| JP | 6-89336 A | 3/1994 |
| JP | 6-301757 A | 10/1994 |
| JP | 10-336518 A | 12/1998 |
| JP | 11-345242 A | 12/1999 |
| JP | 2002-259077 A | 9/2002 |
| JP | 2004-177782 A | 6/2004 |
| JP | 2006-340120 A | 12/2006 |
| JP | 2007-213273 A | 8/2007 |
| JP | 2007-265320 A | 10/2007 |
| JP | 2011-164489 A | 8/2011 |

OTHER PUBLICATIONS

Japanese Office Action (Notice of Grounds of Rejection) dated Nov. 19, 2013, issued by the Japanese Patent Office in corresponding Japanese Patent Application No. 2011-217417, and English language translation of Office Action. (9 pages).

* cited by examiner

*Primary Examiner* — Barry Drennan
*Assistant Examiner* — Robert Craddock
(74) *Attorney, Agent, or Firm* — Buchanan Ingersoll & Rooney PC

(57) ABSTRACT

An image display apparatus includes a storage portion to store application data and reduced image data thereof, in association with each other, a position detection portion to detect a position designated by the user on a display surface of a display portion, an enlargement operation detection portion to detect an enlargement operation, a first image display portion to display a first display image generated from the reduced image data as a preview image, a process target determination portion to determine process target data from the reduced image data and the application data, based on a magnification set based on the amount of operation in the enlargement operation, a second display image generation portion to generate a second display image based on the process target data, in response to the enlargement operation being detected, and a second image display portion to display the second display image as a preview image.

16 Claims, 12 Drawing Sheets

F I G. 1
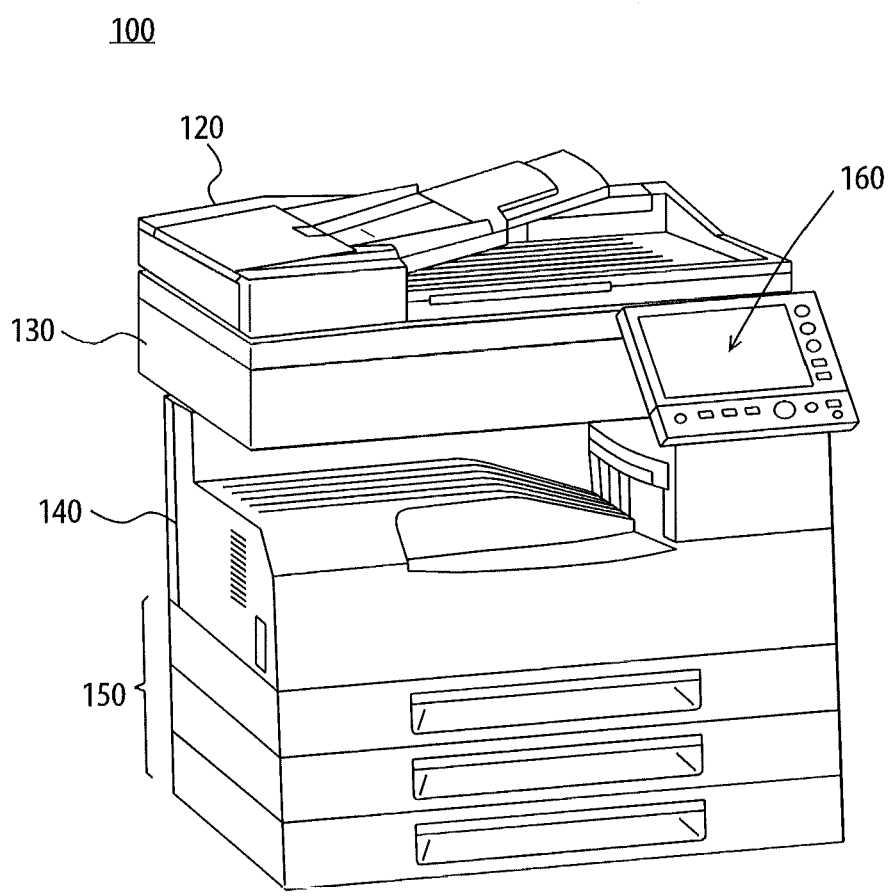

F I G. 3
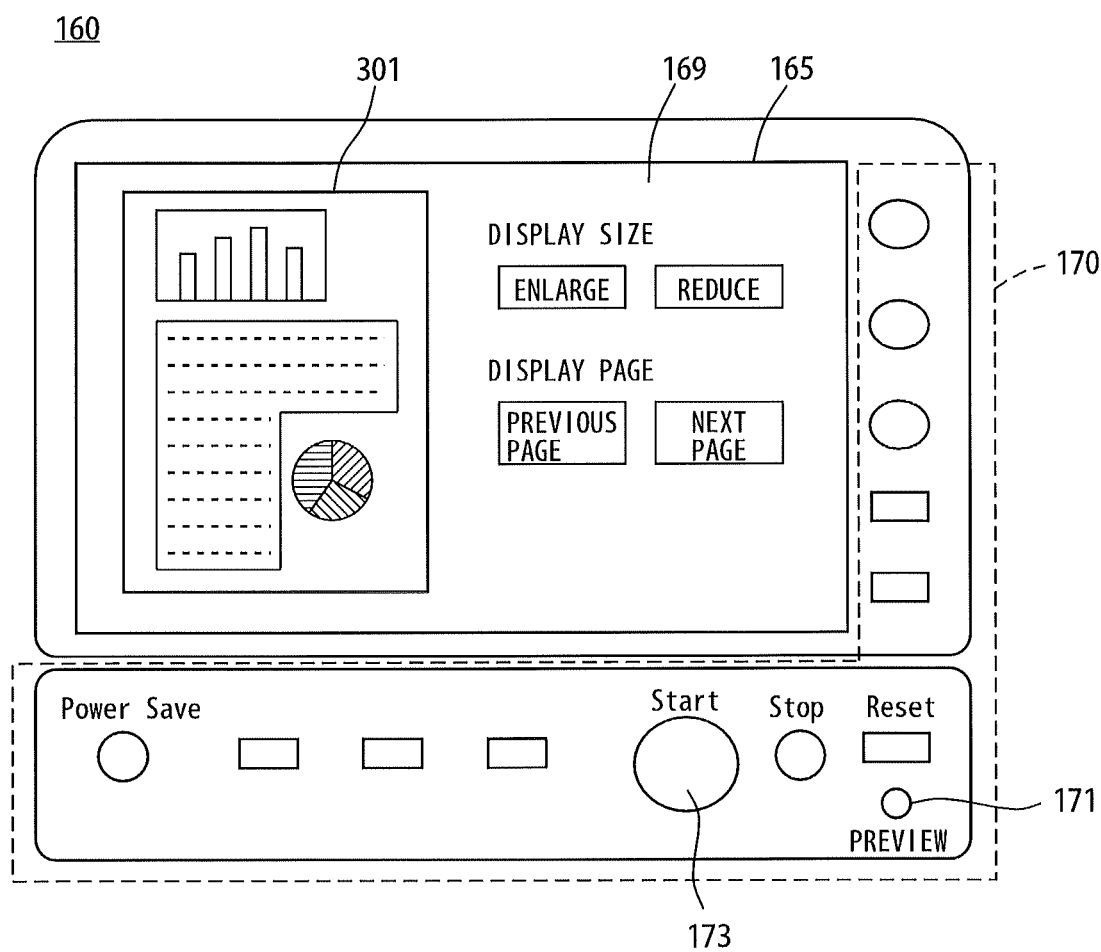

IMAGE DISPLAY APPARATUS, DISPLAY CONTROL METHOD, AND NON-TRANSITORY COMPUTER-READABLE RECORDING MEDIUM ENCODED WITH DISPLAY CONTROL PROGRAM

This application is based on Japanese Patent Application No. 2011-217417 filed with Japan Patent Office on Sep. 30, 2011, the entire content of which is hereby incorporated by reference.

BACKGROUND OF THE INVENTION

1. Field of the Invention

The present invention relates to an image display apparatus, a display control method, and a non-transitory computer-readable recording medium encoded with a display control program. More specifically, the present invention relates to an image display apparatus having a function of previewing an image of data, a display control method performed in the image display apparatus, and a non-transitory computer-readable recording medium encoded with a display control program.

2. Description of the Related Art

Image forming apparatuses represented by Multi-Functional Peripherals (MFPs) have increased variety of functions. In particular, some image forming apparatuses have a preview function of displaying data to be imaged to allow the user to check the finished quality before an image is actually formed. In a case where data to be imaged is compressed, the data has to be expanded by launching an application program. The expansion process takes time, causing a waiting time until an image is displayed.

Japanese Patent Laid-Open No. 11-345242 discloses an image display method in an image display system including a memory for storing image data and a thumbnail thereof, an image processor for processing image data to output an image, communication means for exchanging image data between the memory and the image processor, and a display for displaying image data and a thumbnail thereof, wherein when a thumbnail already displayed is selected, first, the thumbnail is enlarged, and thereafter, the enlarged image is gradually detailed, whereby finally, the original image data of the thumbnail is completely displayed.

However, the conventional image display method always displays original image data when a thumbnail is enlarged. Therefore, in the case where data is compressed data, the data is entirely expanded by launching an application program. Thus, a waiting time still exists until the original image data is completely displayed.

SUMMARY OF THE INVENTION

In order to achieve the object above, according to an aspect of the present invention, an image display apparatus includes: a storage portion to store application data and reduced image data obtained by reducing an image of the application data, in association with each other; a display portion to display a preview image; a position detection portion to detect a position designated by the user on a display surface of the display portion; an enlargement operation detection portion to detect an enlargement operation of giving an instruction to enlarge a preview image when two different positions are detected simultaneously by the position detection portion and a distance between the two positions continuously detected by the position detection portion is changed over time; a first image display portion to display a first display image generated from the reduced image data as the preview image on the display portion; a process target determination portion to determine the amount of operation of the enlargement operation based on the amount of change in the distance between the two positions detected by the enlargement operation detection portion, and to determine process target data from the reduced image data and the application data associated with the reduced image data, based on a magnification set by the amount of operation; a second display image generation portion to generate a second display image based on the determined process target data, in response to the enlargement operation being detected; and a second image display portion to display the generated second display image as the preview image on the display portion.

According to another aspect of the present invention, a display control method is performed in an image display apparatus. The image display apparatus includes a storage portion to store application data and reduced image data obtained by reducing an image of the application data, in association with each other, a display portion to display an image, and a position detection portion to detect a position designated by a user on a display surface of the display portion. The display control method includes: a detection step of detecting an enlargement operation of giving an instruction to enlarge an image when two different positions are detected simultaneously by the position detection portion and a distance between the two positions continuously detected by the position detection portion is changed over time; a first display step of displaying the reduced image data as a first display image on the display portion; a determination step of determining the amount of operation of the enlargement operation based on the amount of change in the distance between the two positions detected in the detection step, and determining one of the reduced image data and the application data associated with the reduced image data as a process target based on a magnification set by the amount of operation; a generation step of, in response to the enlargement operation being detected, generating, as a second display image, at least part of an image obtained by enlarging or reducing the determined process target to an enlarged display size of the first display image at a magnification set based on the amount of operation; and a second display step of displaying the generated second display image.

According to a further aspect of the present invention, a non-transitory computer-readable recording medium is encoded with a display control program performed by a computer that controls an image display apparatus. The image display apparatus includes a storage portion to store application data and reduced image data obtained by reducing an image of the application data, in association with each other, a display portion to display an image, and a position detection portion to detect a position designated by a user on a display surface of the display portion. The display control program causes the computer to execute processing comprising: a detection step of detecting an enlargement operation of giving an instruction to enlarge an image when two different positions are detected simultaneously by the position detection portion and a distance between the two positions continuously detected by the position detection portion is changed over time a first display step of displaying the reduced image data as a first display image on the display portion; a determination step of determining the amount of operation of the enlargement operation based on the amount of change in the distance between the two positions detected in the detection step, and determining one of the reduced image data and the application data associated with the reduced image data as a process target based on a magnification set by the amount of operation; a generation step of, in response to the enlargement operation being detected, generating, as a second display image, at least part of an image obtained by enlarging or reducing the determined process target to an enlarged display size of the first display image at a magnification set based on the amount of operation; and a second display step of displaying the generated second display image.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 1 is an external perspective view showing an MFP in an embodiment of the present invention.

FIG. 3 is a plan view of an operation panel.

DESCRIPTION OF THE PREFERRED EMBODIMENTS

Figure 2:
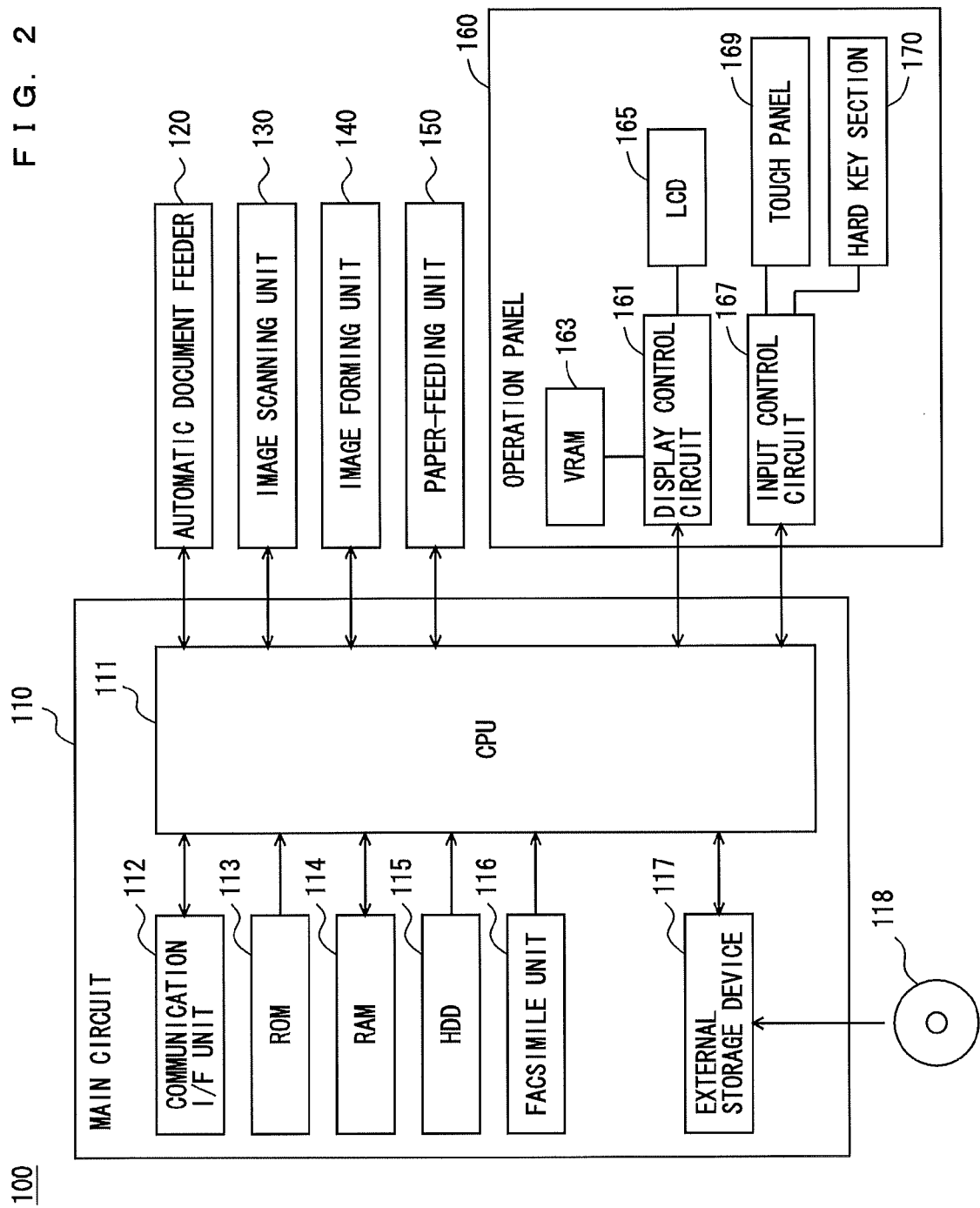
FIG. 2 is a block diagram showing an overview of a hardware configuration of the MFP.

Embodiments of the present invention will be described below with reference to the figures. In the following description, the same parts are denoted with the same reference numerals. Their names and functions are also the same. A detailed description thereof is thus not repeated.

FIG. 1 is an external perspective view showing an MFP in an embodiment of the present invention. FIG. 2 is a block diagram showing an overview of a hardware configuration of the MFP. Referring to FIG. 1 and FIG. 2, an MFP 100 functioning as an image forming apparatus includes a main circuit 110, a document scanning unit 130 for scanning a document, an automatic document feeder (ADF) 120 for conveying a document to document scanning unit 130, an image forming unit 140 for forming an image on paper or the like based on image data output by document scanning unit 130 scanning a document, a paper-feeding unit 150 for supplying paper to image forming unit 140, and an operation panel 160 serving as a user interface.

Main circuit 110 includes a CPU 111, a communication interface (I/F) unit 112, a ROM 113, a RAM 114, an HDD (hard disk drive) 115 serving as mass storage device, a facsimile unit 116, and an external storage device 117. CPU 111 is connected to ADF 120, document scanning unit 130, image forming unit 140, paper-feeding unit 150, and operation panel 160 to control the entire MFP 100.

ADF 120 automatically conveys plural sheets of a document set on a feed tray, one by one, to a prescribed document scanning position set on a platen glass of document scanning unit 130, and outputs the document to an output tray after a document image is scanned by document image scanning unit 130. Document scanning unit 130 includes a light source for applying light to a document conveyed to the document scanning position and a photoelectric transducer element for receiving light reflected at a document to scan a document image corresponding to the size of the document. The photoelectric transducer element converts the received light into image data as an electric signal and outputs the image data to image forming unit 140. Paper-feeding unit 150 conveys a sheet of paper accommodated in the paper feed tray to image forming unit 140.

Image forming unit 140 forms an image by a well-known electrophotographic technique. Image forming unit 140 forms an image on a sheet of paper conveyed by paper-feeding unit 150, based on image data, which is image data input from document scanning unit 130 and subjected to a variety of data processing such as shading correction, or image data externally received.

Facsimile unit 116 is connected to a PSTN (Public Switched Telephone Network) to transmit/receive facsimile data. Facsimile unit 116 converts image data scanned by document scanning unit 130 or data stored in HDD 115 into facsimile data and transmits the facsimile data to a facsimile machine connected to the PSTN. Alternatively, facsimile unit 116 stores the received facsimile data into HDD 115 or allows image forming unit 140 to form an image of the facsimile data on a sheet of paper.

Communication I/F unit 112 is an interface for connecting MFP 100 to a network. Communication I/F unit 112 communicates with another computer or image forming apparatus connected to a network with a communication protocol such as TCP (Transmission Control Protocol) or FTP (File Transfer Protocol). The network to which communication I/F unit 112 is connected is a LAN (Local Area Network) either by wire or by radio. The network is not limited to a LAN and may be a WAN (Wide Area Network), a PSTN, the Internet, or the like.

ROM 113 stores a program executed by CPU 111 or data necessary to execute the program. RAM 114 is used as a working area for CPU 111 to execute a program. RAM 114 temporarily stores scanned images successively sent from document scanning unit 130.

Operation panel 160 includes an LCD (Liquid Crystal Display) 165, a display control circuit 161 for controlling display of LCD 165, a VRAM (Video RAM) 163, a touch panel 169, a hard key section 170, and an input control circuit 167 for controlling touch panel 169 and hard key section 170. LCD 165 and hard key 170 are provided on the top surface of MFP 100.

Display control circuit 161 is connected to CPU 111, VRAM 163, and LCD 165. VRAM 163 is used as a working area for display control circuit 161 to temporarily store an image to be displayed on LCD 165. Display control circuit 161 is controlled by CPU 111 to control LCD 165 and allow LCD 165 to display an image stored in VRAM 163. Display control circuit 161 allows LCD 165 to display a preview screen as described later.

Hard key section 170 includes a plurality of hard keys at least including a start key and a keyboard call key. The hard key is connected to input control circuit 167, outputs an ON signal to input control circuit 167 while being pressed by a user, and outputs an OFF signal to input control circuit 167 while not being pressed by a user.

Touch panel 169 is provided on the upper surface or the lower surface of LCD 165 to output coordinates of a position designated by the user to input control circuit 167. Touch panel 169 is a multi-touch screen panel. Specifically, when the user designates a plurality of positions simultaneously, a plurality of coordinates corresponding to a plurality of positions designated by the user are output to input control circuit 167. Preferably, touch panel 169 has a size equal to or larger than the display surface of LCD 165. Touch panel 169 is provided to be overlaid on LCD 165. Therefore, when the user designates the display surface of LCD 165, touch panel 169 outputs, to input control circuit 167, one or more coordinates corresponding to one or more positions designated by the user on the display surface of LCD 165. Touch panel 169 may employ any system, for example, such as a resistive film system, a surface acoustic wave system, an infrared system, an electromagnetic induction system, or an electrostatic capacity system.

When there exists a hard key that outputs an ON signal in hard key section 170, input control circuit 167 outputs identification information of the hard key that outputs the ON signal, to CPU 111. When touch panel 169 detects one or more positions designated by the user, input control circuit 167 outputs one or more coordinates output from touch panel 169 to CPU 111.

External storage device 117 is controlled by CPU 111. CD-ROM (Compact Disk Read Only Memory) 118 or a semiconductor memory is attached to external storage device 117. Although a case where CPU 111 executes a program stored in ROM 113 is described in the present embodiment, CPU 111 may control external storage device 117 to read a program to be executed by CPU 111 from CD-ROM 118 and store the read program into RAM 102 for execution.

A recording medium for storing a program executed by CPU 111 is not limited to CD-ROM 118 but may be a flexible disk, a cassette tape, an optical disk (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM). CPU 111 may download a program from a computer connected to the network and store the downloaded program into HDD 115, or a computer connected to the network may write a program into HDD 115, so that the program stored in HDD 115 is loaded in RAM 114 and executed by CPU 111. The program referred to here includes not only a program directly executable by CPU 111 but also a source program, a compressed program, an encrypted program, and the like.

FIG. 3 is a plan view of operation panel 160. Referring to FIG. 3, operation panel 160 includes LCD 165, touch panel 169 overlaid on LCD 165, and hard key section 170 including a plurality of hard keys arranged on the right side and below LCD 165. Hard key section 170 includes a start key 171 and a preview button 173.

Figure 4:
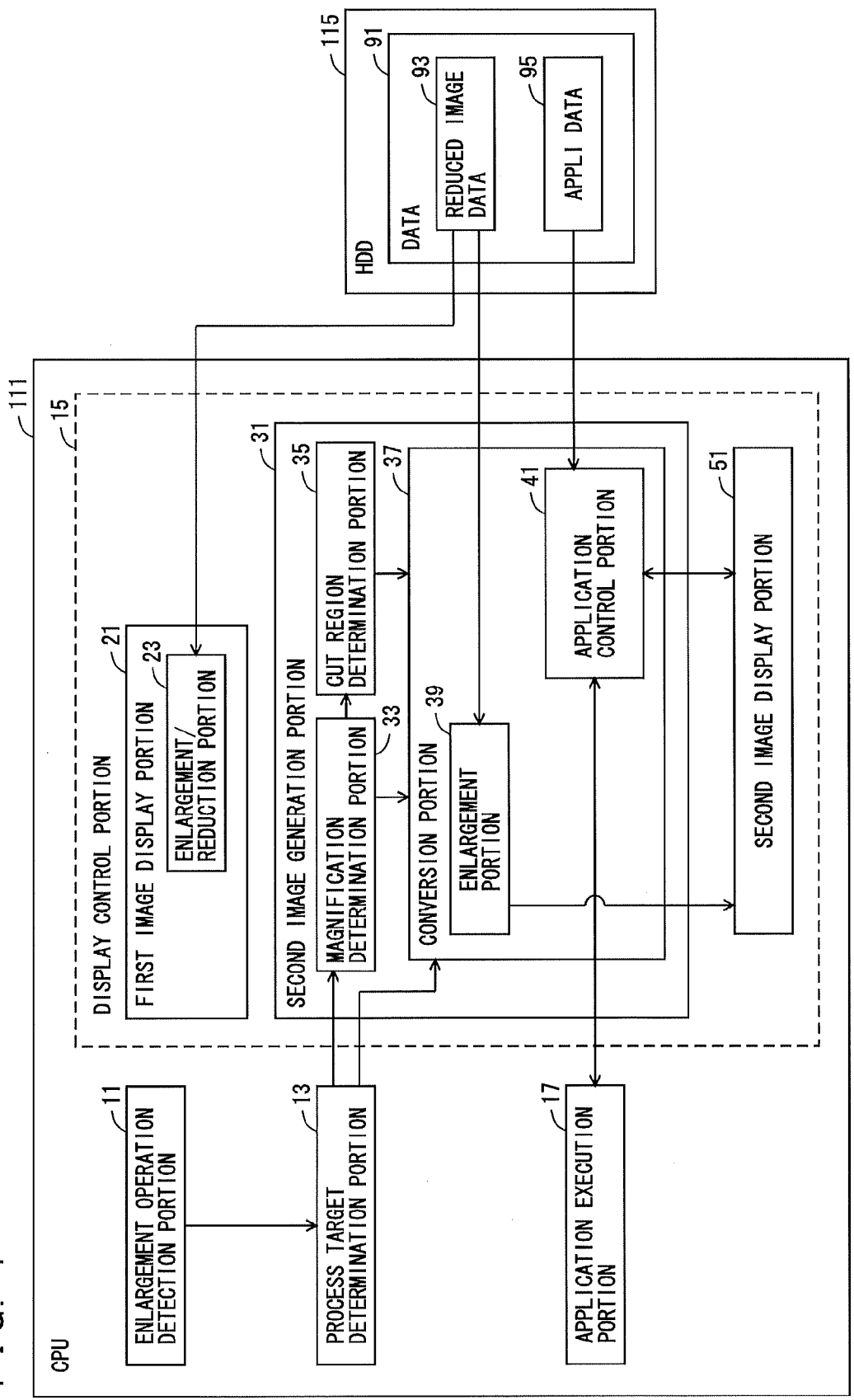
FIG. 4 is a block diagram showing an example of functions of a CPU of the MFP, with data stored in an HDD.

FIG. 4 is a block diagram showing an example of functions of the CPU of the MFP, with data stored in the HDD. The functions shown in FIG. 4 are functions implemented by CPU 111 when CPU 111 of MFP 100 executes a display control program stored in ROM 113, HDD 115, or CD-ROM 118.

Referring to FIG. 4, HDD 115 stores data 91. Data 91 includes reduced image data 93 and appli data 95. Reduced image data 93 is data of an image obtained by reducing an image of appli data 95. Reduced image data 93 and appli data 95 are associated with each other in advance. Reduced image data 93 is, for example, thumbnail data. Appli data 95 is data generated by CPU 111 executing an application program.

Examples of the application program include an image compression/expansion program for compressing and expanding image data, a spreadsheet program, a document editing program, and a browsing program. Here, the application program for use with appli data 95 is an image compression program, by way of example. In this case, CPU 111 executes the image compression/expansion program to compress image data as appli data 95, which is in turn stored in to HDD 115. CPU 111 executes the image compression/expansion program to read out appli data 95 stored in HDD 115 and convert the read appli data 95 into image data. Therefore, CPU 111 has to execute the image compression/expansion program in order to display an image of appli data 95, whereas CPU 111 does not have to execute the image compression/expansion program in order to display an image of reduced image data 93. Although a case where data 91 includes reduced image data 93 and appli data 95 is described by way of example, reduced image data 93 and appli data 95 may be different files. In this case, reduced image data 93 and appli data 95 are associated with each other, for example, using an association table.

CPU 111 includes an enlargement operation detection portion 11 for detecting an enlargement operation input by the user, a process target determination portion 13 for determining data to be processed (hereinafter referred to as "process target data"), a display control portion 15 for controlling display of an image, and an application execution portion 17 for executing an application program.

Display control portion 15 controls display control circuit 161 to display a preview image on LCD 165. The preview image is an image of data 91 that is displayed on LCD 165 before image forming unit 140 forms an image of data 91 stored in HDD 115. Display control portion 15 includes a first image display portion 21, a second image generation portion 31, and a second image display portion 51.

First image display portion 21 generates a first display image from reduced image data 93 included in data 91 and allows display control circuit 161 to display the first display image as a preview image on LCD 165. The display size of the preview image is predetermined. The time taken for first image display portion 21 to generate the first display image is shorter than the time taken for second image generation portion 31 to generate a second display image from an image of appli data 95 as described later, because the first display image is generated from reduced image data 93. Therefore, in the case where the first display image is a preview image, the waiting time for the user until a preview image is displayed on LCD 165 can be shortened.

Enlargement operation detection portion 11 receives one or more coordinates from input control circuit 167. One or more coordinates are coordinates of the positions designated by the user on touch panel 169. In the case where the user designates a plurality of positions simultaneously on touch panel 169, enlargement operation detection portion 11 receives from input control circuit 167 a plurality of coordinates corresponding to a plurality of positions simultaneously designated on touch panel 169.

Enlargement operation detection portion 11 detects an enlargement operation by the user based on a temporal change of coordinates input from input control circuit 167 and also detects the amount of operation. Here, the enlargement operation is an operation of designating with two fingers simultaneously and widening the distance between two positions designated with the two fingers. This is called a pinch-out operation. Conversely, a reduction operation is an operation of designating with two fingers simultaneously and narrowing the distance between two positions designated with the two fingers. This is called a pinch-in operation. Enlargement operation detection portion 11 detects an enlargement operation or a reduction operation based on a change of distance between two coordinates input from input control circuit 167, and also detects the amount of operation. An operation amount D is obtained from a distance L1 between two coordinates at a first time and a distance L2 between two coordinates at a second time later than the first time. The operation amount D is a value obtained by subtracting the distance L1 from the distance L2. If the operation amount D is a positive value, the operation is an enlargement operation. If the operation amount D is a negative value, the operation is a reduction operation. The first time is the initial time at which two coordinates are input simultaneously from input control circuit 167. The second time is a time at which the distance between the two coordinates simultaneously input from input control circuit 167 stops changing.

The enlargement and reduction operations are not limited to pinch-out and pinch-in operations but may be an operation of designating with one finger or an operation of designating with three or more fingers. For example, the enlargement and reduction operations may be an operation of designating the same position with one finger for a prescribed period of time and thereafter sliding the finger in a prescribed direction. The enlargement and reduction operations can be distinguished from each other based on the direction in which the finger is slid. Alternatively, the enlargement operation may be an operation of designating with three or more fingers and widening the distance between two positions designated by two fingers located at opposite ends of the three or more fingers, and the reduction operation may be an operation of narrowing the distance. Upon detection of an enlargement operation, enlargement operation detection portion 11 outputs the amount of operation to process target determination portion 13.

Process target determination portion 13 determines one of reduced image data 93 and appli data 95 included in data 91 set as a process target, as process target data, based on the amount of operation input from enlargement operation detection portion 11. Specifically, if the amount of operation is equal to or smaller than a first threshold value, process target determination portion 13 determines reduced image data 93 as process target data. If the amount of operation is greater than the first threshold value, process target determination portion 13 determines appli data 95 as process target data. Process target determination portion 13 outputs data identification information for identifying the determined process target data and the amount of operation to second image generation portion 31.

Second image generation portion 31 generates a second display image by enlarging or reducing an image of the process target data specified by the data identification information input from process target determination portion 13, to the same display size as the enlarged image obtained by enlarging the first display image at a magnification set based on the amount of operation input from process target determination portion 13. Second image generation portion 31 outputs the generated second display image to second image display portion 51.

Second image generation portion 31 includes a magnification determination portion 33 for determining a magnification based on the amount of operation, a cut region determination portion 35, and a conversion portion 37 for enlarging or reducing an image of process target data. Conversion portion 37 includes an enlargement portion 39 for enlarging or reducing reduced image data 93 and an application control portion 41 for reducing or enlarging an image of appli data 95.

Magnification determination portion 33 determines a magnification based on the amount of operation input from process target determination portion 13 and outputs the determined magnification to cut region determination portion 33 and conversion portion 37. The relation between the amount of operation and the magnification is set in advance, and the magnification is determined based on the amount of operation input from process target determination portion 13. The relation between the amount of operation and the magnification is preferably proportional. For example, when the factor of proportionality is C, the magnification is represented by C×the amount of operation. The factor of proportionality is not limited thereto and may be changed according to the amount of operation.

Cut region determination portion 35 receives a magnification from magnification determination portion 33. Cut region determination portion 35 determines a cut region having the same display size as the display size of the preview image, in the image obtained by enlarging the first display image at the magnification input from magnification determination portion 33. The image obtained by enlarging the first display image at the magnification input from magnification determination portion 33 is hereinafter referred to as the enlarged image. The cut region indicates a position in the enlarged image. For example, the cut region, which has a rectangular shape, includes the respective coordinates of two opposite angles in the enlarged image. The enlarged image has a display size larger than the preview image because the enlarged image is an image obtained by enlarging the first display image. Therefore, a region having the same display size as the display size of the preview image is obtained from the enlarged image and set as a cut region, whereby the display size of the preview image can be kept constant. In this manner, a cut region is determined in order to keep the display size of a preview image constant on LCD 165. Cut region determination portion 35 is unnecessary in a case where the display size of a preview image is not kept constant.

Cut region determination portion 35 outputs the determined cut region to conversion portion 37. Here, cut region determination portion 35 determines, as a cut region, a region where the center of the enlarged image coincides with the center of the first display image. The cut region may be determined based on the direction and distance in which two coordinates input from input control circuit 167 are moved. For example, the direction and distance in which both of the two coordinates input from input control circuit 167 are moved is detected, or the direction and distance in which one of them is moved is detected. Then, a point moved by the detected direction and distance in the enlarged image is set as the center of the enlarged image and is matched with the center of the first display image. Then, the region where the enlarged image is overlapped with the first display image is determined as a cut region.

Enlargement portion 39 receives data identification information from process target determination portion 13, a magnification from magnification determination portion 33, and a cut region from cut region determination portion 35. When the data identification information input from process target determination portion 13 specifies reduced image data 93, enlargement portion 39 reads out reduced image data 93 included in data 91 stored in HDD 115 and generates a second display image based on the read reduced image data 93. Enlargement portion 39 outputs the generated second display image to second image display portion 51.

Specifically, enlargement portion 39 generates an image by enlarging or reducing reduced image data 93 to the same display size as the enlarged image and sets the generated image as a second display image. When the display size of reduced image data 93 is smaller than the display size of the enlarged image, an image is generated by enlarging reduced image data 93 to the display size of the enlarged image. When the display size of reduced image data 93 is greater than the display size of the enlarged image, an image is generated by reducing reduced image data 93 to the display size of the enlarged image.

When the display size of reduced image data 93 is larger than the display size of the enlarged image and when a cut region is input from cut region determination portion 35, enlargement portion 39 obtains a partial magnification for enlarging reduced image data 93 to the same display size as the enlarged image, generates an image by enlarging or reducing a portion corresponding to the cut region in reduced image data 93 at the partial magnification, and sets the generated image as a second display image. By minimizing the amount of data to be processed by enlargement portion 39, the load on enlargement portion 39 can be reduced, and the time taken to generate a second display image can thus be shortened. It is also possible to generate an image by enlarging reduced image data 93 to the same display size as the enlarged image and to set a portion corresponding to the cut region in the generated image as a second display image.

Application control portion 41 controls application execution portion 17 to allow application execution portion 17 to execute an application program for use with appli data 95 and allow application execution portion 17 to generate an image of appli data 95. Application control portion 41 receives data identification information from process target determination portion 13, a magnification from magnification determination portion 33, and a cut region from cut region determination portion 35.

When the data identification information input from process target determination portion 13 specifies appli data 95, application control portion 41 reads out appli data 95 included in data 91 stored in HDD 115 and outputs the read appli data 95 to application execution portion 17 to allow application execution portion 17 to generate an image of appli data 95. Application control portion 41 generates a second display image based on the image of appli data 95 that is generated by application execution portion 17 and outputs the generated second display image to second image display portion 51.

Specifically, application control portion 41 generates an image by enlarging or reducing the image of appli data 95 to the same display size as the enlarged image and sets the generated image as a second display image. When the display size of the image of appli data 95 is smaller than the display size of the enlarged image, application control portion 41 generates an image by enlarging the image of appli data 95 to the display size of the enlarged image. When the display size of the image of appli data 95 is larger than the display size of the enlarged image, application control portion 41 generates an image by reducing the image of appli data 95 to the display size of the enlarged image.

When a cut region is input from cut region determination portion 35, application control portion 41 obtains a partial magnification for enlarging or reducing the image of appli data 95 to the same display size as the enlarged image, before allowing application execution portion 17 to generate the image of appli data 95, and then allows application execution portion 17 to generate only a portion corresponding to the cut region in the image of appli data 95. Application control portion 41 then sets an image obtained by enlarging or reducing the generated image at the partial magnification, as a second display image. By minimizing the amount of data to be processed by application execution portion 17, the load on application execution portion 17 can be reduced, and the time taken to generate a second display image can be shortened. It is also possible to allow application execution portion 17 to generate the image of appli data 95, to generate an image by enlarging or reducing the generated image of appli data 95 to the same display size as the enlarged image, and to set a portion corresponding to the cut region in the generated image as a second display image.

In response to a second display image input from enlargement portion 39 or application control portion 41, second image display portion 51 outputs the second display image as a preview image to display control circuit 161 and allows LCD 165 to display the second display image in place of the first display image appearing on LCD 165.

Figure 5:
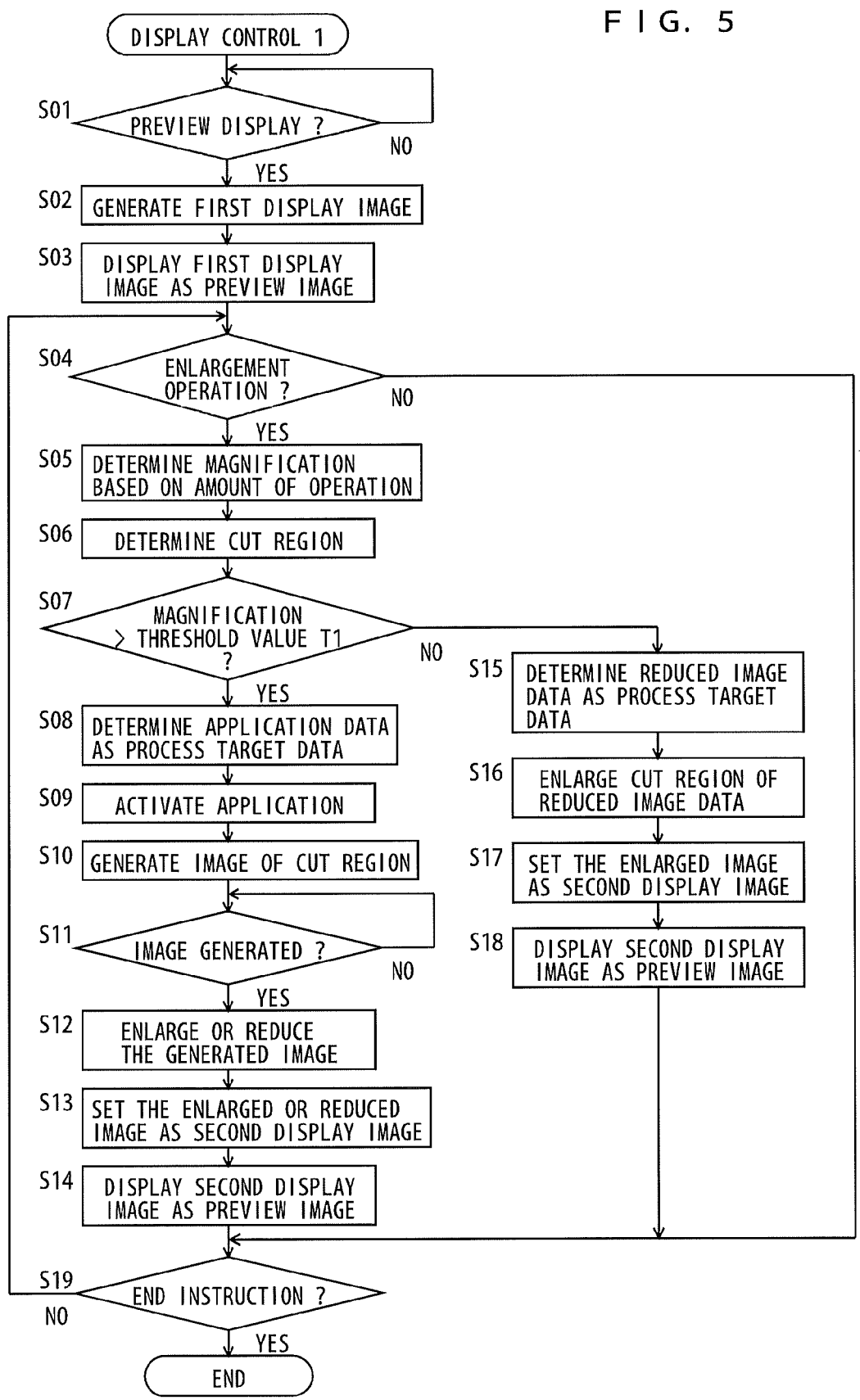
FIG. 5 is a flowchart showing an exemplary flow of a display control process.

FIG. 5 is a flowchart showing an exemplary flow of a display control process. The display control process is a process executed by CPU 111 when CPU 111 of MFP 100 executes a display control program stored in ROM 113, HDD 115, or CD-ROM 118. Referring to FIG. 5, CPU 111 determines whether a preview instruction is accepted (step S01). A preview instruction is accepted when it is detected that preview button 173 of hard key section 170 of operation panel 160 is pressed. The process waits until a preview instruction is accepted (NO in step S01). If a preview instruction is accepted (YES in step S01), the process proceeds to step S02. The preview instruction includes designation of data 91 stored in HDD 115.

In step S02, a first display image is generated from reduced image data 93 included in data 91. In the next step S03, the first display image is displayed as a preview image on LCD 165. The first display image is output to display control circuit 161, so that the first display image is displayed on LCD 165. At this stage, the first display image generated from reduced image data 93 is displayed as a preview image on LCD 165.

In the next step S04, it is determined whether an enlargement operation is accepted. It is determined that an enlargement operation is accepted when two coordinates are simultaneously input from input control circuit 167 and a distance between the two coordinates is changed. If an enlargement operation is accepted, the process proceeds to step S05. If not, the process proceeds to step S19. In step S05, a magnification is determined from the amount of operation in the enlargement operation. The amount of operation is detected based on the changed distance between the two coordinates simultaneously input from input control circuit 167. The operation amount D is calculated by detecting a distance L1 between two coordinates at a first time and a distance L2 between the two coordinates at a second time and using the amount of operation D=the distance L2−the distance L1. The first time is the initial time at which two coordinates are simultaneously input from input control circuit 167, and the second time is the time at which the distance between the two coordinates simultaneously input from input control circuit 167 stops changing. Then, a magnification is determined using the predetermined relation between the amount of operation and the magnification, here, the magnification=C×the amount of operation (C is the factor of proportionality).

In step S06, a cut region is determined. A cut region having the same display size as the display size of the preview image is determined in the enlarged image obtained by enlarging the first display image at the magnification determined in step S05. The cut region indicates a position in the enlarged image.

For example, the cut region, which has a rectangular shape, includes the respective coordinates of two opposite angles in the enlarged image.

In the next step S07, the magnification determined in step S05 is compared with a threshold value T1. The process branches based on the comparison result. If the magnification is greater than the threshold value T1, the process proceeds to step S08. If the magnification is equal to or smaller than the threshold value T1, the process proceeds to step S15.

In step S08, appli data 95 is determined as a process target. Then, the application for use with the determined appli data 95 is activated (step S09) to generate an image of a portion corresponding to the cut region determined in step S06 (step S10). Specifically, the application program for use with appli data 95 is executed. The cut region is passed as an argument to a task executing the application program so that the task executing the application program generates an image of a portion corresponding to the cut region of appli data 95. Then, the process waits until an image is generated by the task executing the application program (NO in step S11). When an image is generated (YES in step S11), the image is acquired from the task executing the application program.

The image generated by the task executing the application program is enlarged or reduced (step S12). The image generated by the task executing the application program is enlarged or reduced so that the image has the same display size as the display size of the preview image.

In the next step S13, the image enlarged or reduced in step S12 is set as a second display image. In the next step S14, the second display image is displayed as a preview image on LCD 165. The process then proceeds to step S19. The second display image is output to display control circuit 161, so that the second display image is displayed on LCD 165. At this stage, the second display image generated from appli data 95 is displayed as a preview image on LCD 165. Therefore, the second display image having a resolution higher than the first display image generated from reduced image data 93 is displayed as a preview image. Thus, in this case, even when a preview image is enlarged, a sharp image can be displayed.

On the other hand, in step S15, reduced image data 93 is determined as process target data. Then, a portion corresponding to the cut region in an image of reduced image data 93 is enlarged (step S16). A portion corresponding to the cut region in an image of reduced image data 93 is enlarged so that the image has the same display size as the display size of the preview image. Then, the image enlarged or reduced in step S16 is set as a second display image (step S17). In the next step S18, the second display image is displayed as a preview image on LCD 165. The process then proceeds to step S19. The second display image is output to display control circuit 161 so that the second display image is displayed on LCD 165. At this stage, the second display image generated from reduced image data 93 is displayed as a preview image on LCD 165. Therefore, a preview image can be promptly displayed on LCD 165 although its resolution is low.

In step S19, it is determined whether an end instruction is accepted. If an end instruction is accepted, the process ends. If not, the process returns to step S04.

The preview image displayed in step S03 is the first display image. The first display image is generated from reduced image data 93 and therefore does not require activation of the application. Therefore, the time taken for the first display image to be displayed on LCD 165 is shorter than when the second display image is displayed as a preview image. Accordingly, the time taken to initially display a preview image in step S03 after the display control process is executed can be minimized, thereby shortening the user's waiting time.

If the enlargement operation is accepted and if the magnification based on the amount of operation is greater than the threshold value T1, the preview image displayed on LCD 165 in step S14 is the second display image generated based on appli data 95. The second display image generated based on appli data 95 has a resolution higher than that of the first display image displayed on LCD 165 in step S03 or the second display image displayed on LCD 165 in step S18 that is generated based on reduced image data 93. Therefore, even when the preview image is enlarged, a sharp image can be displayed. On the other hand, if the enlargement operation is accepted and if the magnification based on the amount of operation is equal to or smaller than the threshold value T1, the preview image displayed on LCD 165 in step S18 is the second display image generated from reduced image data 93. Thus, there is no need to activate the application, and the time required to display the preview image on LCD 165 is shorter than when the second display image is displayed as a preview image. In addition, the image quality of the enlarged image of reduced image data 93 is still not significantly degraded because the magnification is equal to or smaller than the threshold value T1. Therefore, even when the enlargement operation is accepted, if the amount of operation is equal to or smaller than the threshold value T1, the second display image generated from reduced image data 93 is displayed as a preview image. As a result, the time taken to display the enlarged preview image can be minimized, thereby shortening the user's waiting time.

<First Modification>

Figure 6:
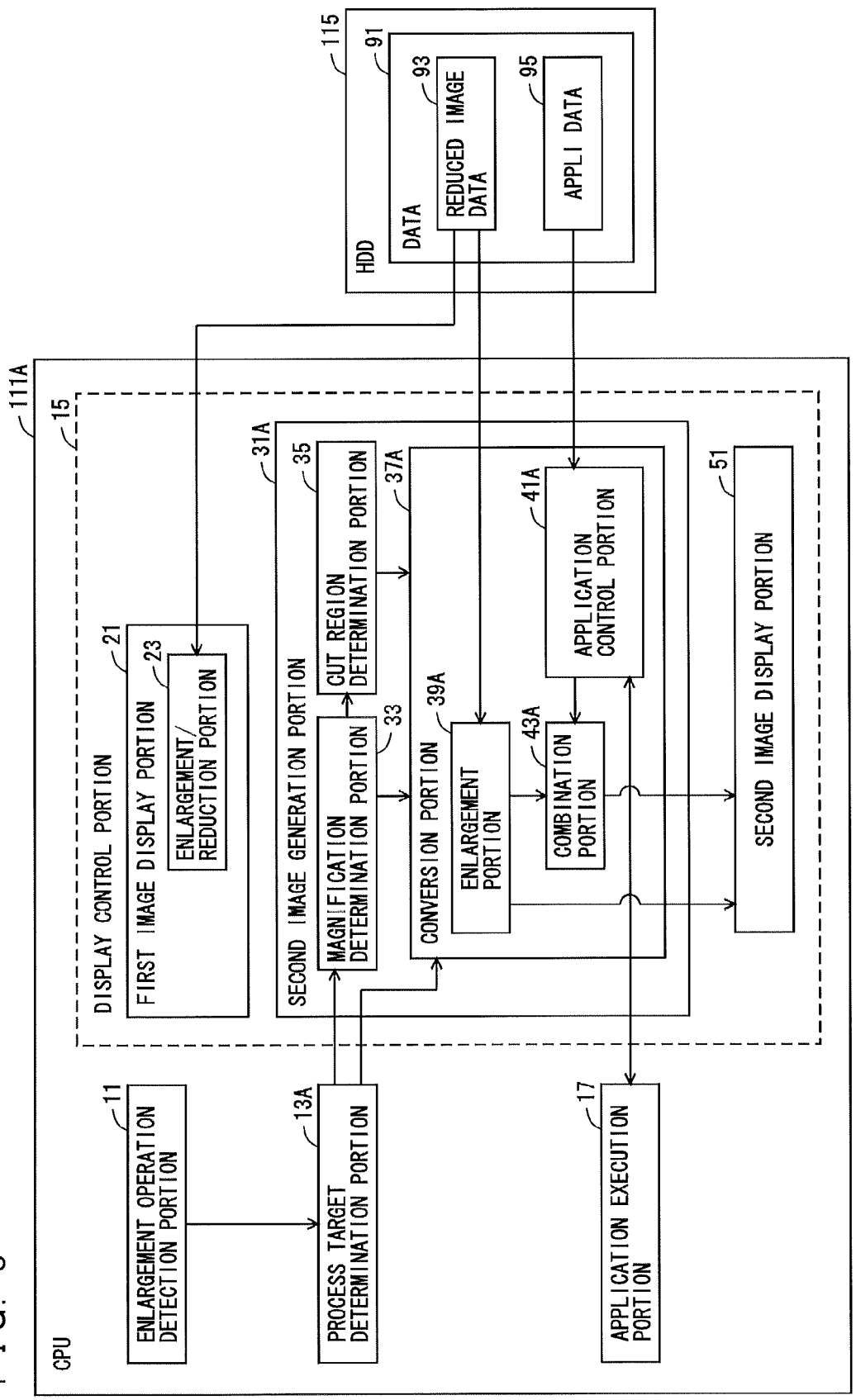
FIG. 6 is a block diagram showing an example of functions of a CPU of an MFP in a first modification, with data stored in the HDD.

FIG. 6 is a block diagram showing an example of functions of a CPU of an MFP, with data stored in the HDD in a first modification. The functions shown in FIG. 6 are implemented by a CPU 111A when CPU 111A of an MFP 100A in the first modification executes a display control program stored in ROM 113, HDD 115, or CD-ROM 118.

The functions shown in FIG. 6 are different those shown in FIG. 4 in that process target determination portion 13, second image generation portion 31, conversion portion 37, enlargement portion 39, and application control portion 41 are changed to a process target determination portion 13A, a second image generation portion 31A, a conversion portion 37A, an enlargement portion 39A, and an application control portion 41A, respectively, and in that a combination portion 43A is added. The other functions are the same and a description thereof is thus not repeated here.

Process target determination portion 13A determines process target data from reduced image data 93 and appli data 95 included in data 91 set as a process target, based on the amount of operation input from enlargement operation detection portion 11. Specifically, when the amount of operation is equal to or smaller than the first threshold value, process target determination portion 13A determines reduced image data 93 as process target data. When the amount of operation is greater than the first threshold value, process target determination portion 13A determines appli data 95 as process target data for a region of interest and determines reduced image data 93 as process target data for a peripheral region excluding the region of interest. The region of interest is a predetermined region of the preview image, and the peripheral region is a region, excluding the region of interest, of the preview image.

Process target determination portion 13A outputs data identification information for identifying the determined process target data, the amount of operation, and a conversion signal to second image generation portion 31A. When the amount of operation is equal to or smaller than the first threshold value, the conversion signal includes an instruction to select reduced image data 93. When the amount of operation is greater than the first threshold value, the conversion signal includes an instruction to select reduced image data 93 and appli data 95.

Second image generation portion 31A generates a second display image by enlarging or reducing an image of process target data specified by the data identification information input from process target determination portion 13A, to the same display size as the enlarged image obtained by enlarging the first display image at the magnification set based on the amount of operation input from process target determination portion 13A. Second image generation portion 31A outputs the generated second display image to second image display portion 51.

Enlargement portion 39A receives data identification information and a conversion signal from process target determination portion 13A, a magnification from magnification determination portion 33, and a cut region from cut region determination portion 35. When the conversion signal input from process target determination portion 13A includes an instruction to select reduced image data 93, enlargement portion 39A reads out reduced image data 93 included in data 91 stored in HDD 115 and generates a second display image based on the read reduced image data 93. Enlargement portion 39A outputs the generated second display image to second image display portion 51. When a cut region is input from cut region determination portion 35, enlargement portion 39A obtains a partial magnification for enlarging or reducing reduced image data 93 to the same display size as the enlarged image, generates an image by enlarging or reducing a portion corresponding to the cut region from reduced image data 93 at the partial magnification, and sets the generated image as a second display image. It is also possible to generate an image by enlarging or reducing reduced image data 93 to the same display size as the enlarged image and to set a portion corresponding to the cut region in the generated image as a second display image.

When the conversion signal input from process target determination portion 13A includes an instruction to select reduced image data 93 and appli data 95, enlargement portion 39A reads out reduced image data 93 included in data 91 stored in HDD 115 and generates a portion corresponding to a peripheral region of a second display image based on a portion corresponding to a peripheral region of the read reduced image data 93. Enlargement portion 39A outputs the portion corresponding to the peripheral region of the second display image to combination portion 43A. When a cut region is input from cut region determination portion 35, enlargement portion 39A obtains a partial magnification for enlarging or reducing reduced image data 93 to the same display size as the enlarged image, generates an image by enlarging or reducing a portion corresponding to the cut region and the peripheral region from reduced image data 93 at the partial magnification, and sets the generated image as a peripheral region portion of the second display image. It is also possible to generate an image by enlarging or reducing reduced image data 93 to the same display size as the enlarged image and to set a portion corresponding to the cut region and the peripheral region in the generated image, as the peripheral region portion of the second display image.

Application control portion 41A controls application execution portion 17 to allow application execution portion 17 to execute an application program for use with appli data 95 and allow application execution portion 17 to generate an image of appli data 95. Application control portion 41A receives data identification information and a conversion signal from process target determination portion 13A, a magnification from magnification determination portion 33, and a cut region from cut region determination portion 35.

When the conversion signal input from process target determination portion 13A includes an instruction to select reduced image data 93 and appli data 95, application control portion 41A obtains a partial magnification for enlarging or reducing an image of appli data 95 to the same display size as the enlarged image, before allowing application execution portion 17 to generate an image of appli data 95, and allows application execution portion 17 to generate only a portion corresponding to the region of interest in an image of appli data 95. Then, application control portion 41 sets an image obtained by enlarging or reducing the generated image at the partial magnification, as a portion corresponding to the region of interest of the second display image. Application control portion 41A outputs the generated portion corresponding to the region of interest of the second display image to combination portion 43A. It is also possible to allow application execution portion 17 to generate an image of appli data 95, to generate an image by enlarging or reducing the generated image of appli data 95 to the same display size as the enlarged image, and to set a portion corresponding to the region of interest in the generated image, as a portion corresponding to the region of interest of the second display image.

When the conversion signal including an instruction to select reduced image data 93 and appli data 95 is input from process target determination portion 13A, combination portion 43A receives a portion corresponding to the peripheral region of the second display image from enlargement portion 39A and a portion corresponding to the region of interest of the second display image from application control portion 41A. Combination portion 43A generates an image by combining the portion corresponding to the peripheral region of the second display image that is input from enlargement portion 39A and the portion corresponding to the region of interest of the second display image that is input from application control portion 41A together, and outputs the generated image as a second display image to second image display portion 51.

Figure 7:
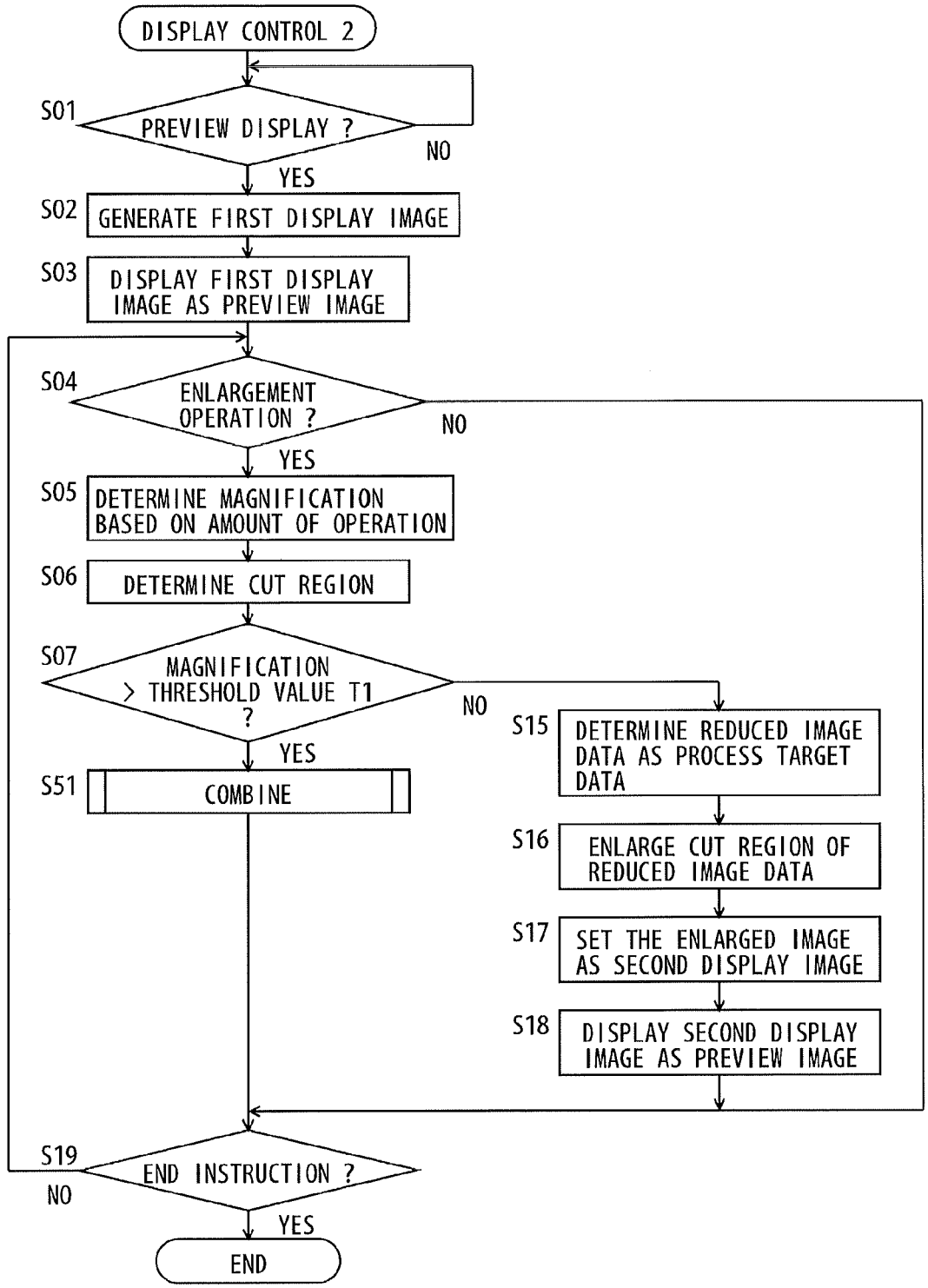
FIG. 7 is a flowchart showing an exemplary flow of a display control process in the first modification.

FIG. 7 is a flowchart showing an exemplary flow of a display control process in the first modification. Referring to FIG. 7, the display control process in the first modification differs from the display control process shown in FIG. 5 in that step S51 is executed in place of steps S08 to S14. Other process is the same as the process shown in FIG. 5 and a description thereof is therefore not repeated here.

Figure 8:
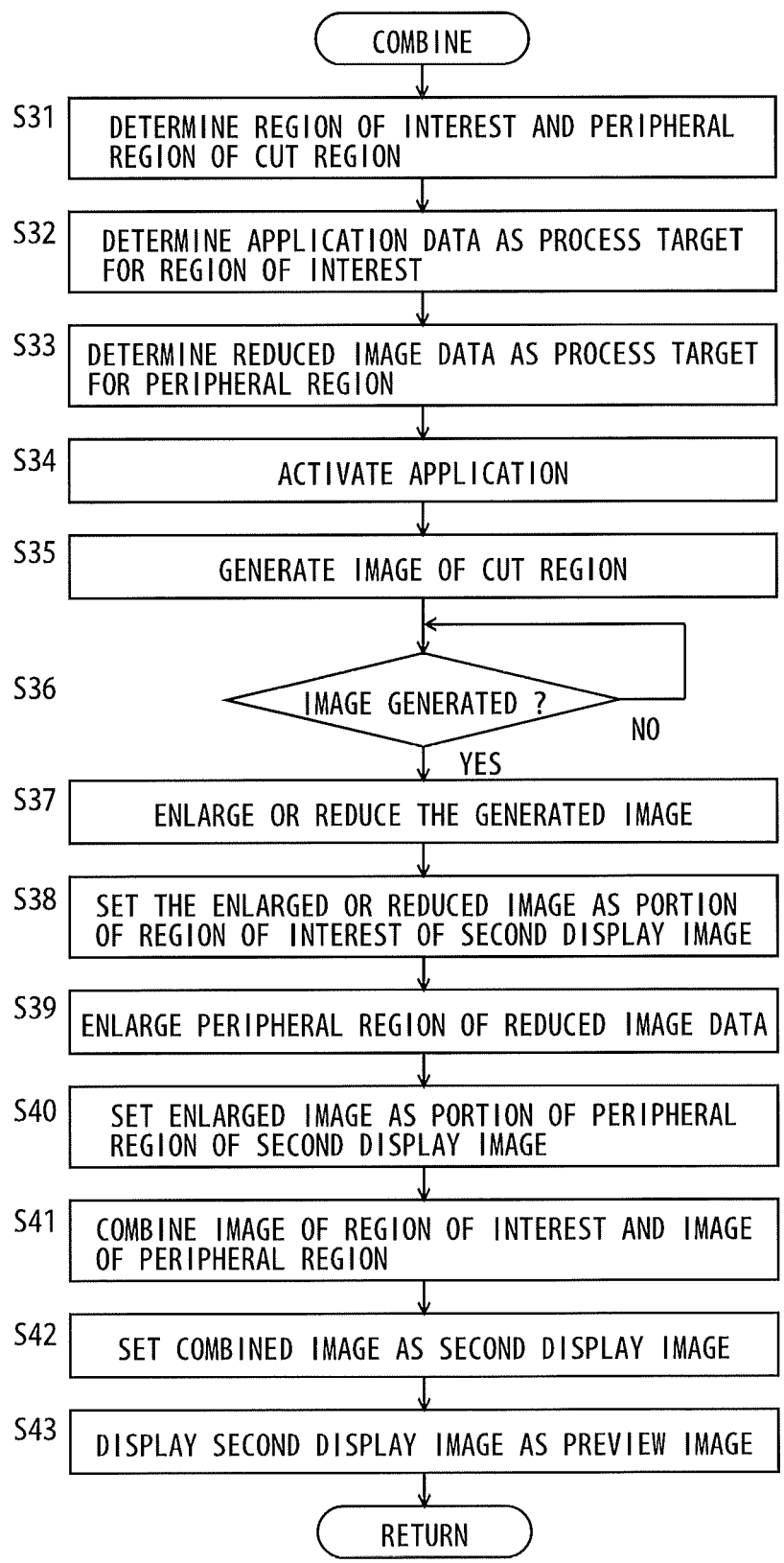
FIG. 8 is a flowchart showing an exemplary flow of a combination process.

In step S51, a combination process is executed, and the process then proceeds to step S19. FIG. 8 is a flowchart showing an example of the combination process. Referring to FIG. 8, in step S31, the region of interest and the peripheral region are determined in the cut region determined in step S06. The region of interest is a region in a prescribed range that includes the center of the cut region. The peripheral region is a region excluding the region of interest in the cut region. Then, application data is determined as a process target for the region of interest (the next step S32), and reduced image data is determined as process target data for the peripheral region (step S33).

In the next step S34, an application for use with appli data 95 determined as a process target is activated. Then, an image of a portion corresponding to the region of interest determined in step S31 is generated (step S35). Specifically, an application program for use with appli data 95 is executed. The region of interest is passed as an argument to a task executing the application program so that the task executing the application program generates an image of a portion corresponding to the region of interest of appli data 95. Then, the process waits until an image is generated by the task executing the application program (NO in step S36). When an image is generated (YES in step S36), an image is acquired from the task executing the application program.

Then, the image generated by the task executing the application program is enlarged or reduced (step S37). The image generated by the task executing the application program is enlarged or reduced so that the image has the same display size as the display size of the region of interest of the preview image. In the next step S38, the image enlarged or reduced in step S37 is set as a portion corresponding to the region of interest of the second display image.

In step S39, a portion corresponding to the peripheral region of the image of reduced image data 93 determined as a process target is enlarged. A portion corresponding to the peripheral region of the image of reduced image data 93 is enlarged so that the image has the same display size as the display size of the peripheral region of the preview image. Then, the image enlarged in step S39 is set as a portion corresponding to the peripheral region of the second display image (step S40). In the next step S41, the image of the region of interest that is set as a portion corresponding to the region of interest in step S38 is combined with the image of the peripheral region that is set as a portion corresponding to the peripheral region in step S40. The combined image is thus generated. Then, the generated combined image is set as the second display image (step S42). The second display image is displayed as a preview image on LCD 165. The process then returns to the display control process. The second display image is output to display control circuit 161 so that the second display image is displayed on LCD 165.

At this stage, the preview image includes an image generated from appli data 95 in its region of interest, and the peripheral region includes an image generated from reduced image data 93. Therefore, the resolution of the region of interest is higher than the resolution of the peripheral region. As a result, the time taken to generate a preview image can be minimized while a sharp image having a partially high resolution can be displayed.

Figure 9:
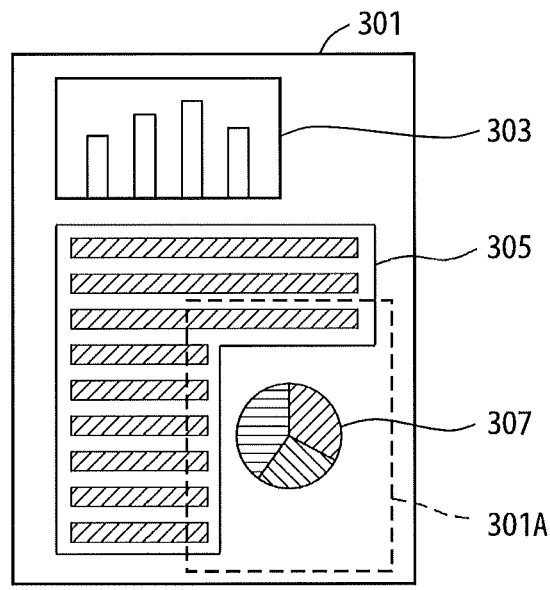
FIG. 9 is a diagram showing an example of a preview image.

FIG. 9 is a diagram showing an example of a preview image. FIG. 9 shows a case where a preview image 301 is the first display image generated from reduced image data 93. Preview image 301 includes a region 303 showing a bar graph, a region 305 showing characters, and a region 307 showing a circle graph. As preview image 301 is the first display image generated from reduced image data 93, the user who views preview image 301 can recognize that a bar graph is shown in region 303, characters are shown in region 305, and a circle graph is shown in region 307. However, because of a low resolution, the user cannot read the specific values in the bar graph, cannot recognize the characters, and cannot read the values in the circle graph. Although a cut region 301A is shown by a dotted line in preview image 301, the dotted line actually does not exist.

Figure 10:
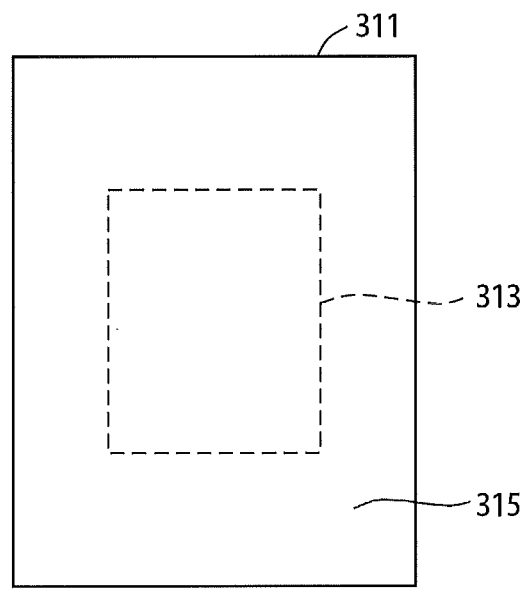
FIG. 10 is a diagram showing an example of a region of interest and a peripheral region.

FIG. 10 is a diagram showing an example of a region of interest and a peripheral region. Referring to FIG. 10, a region of interest 313 is shown at the center within an outer frame 311. The region excluding region of interest 313 within outer frame 311 is a peripheral region 315. Outer frame 311 is the outer frame of the preview image. It is also the outer frame of the cut region.

Figure 11:
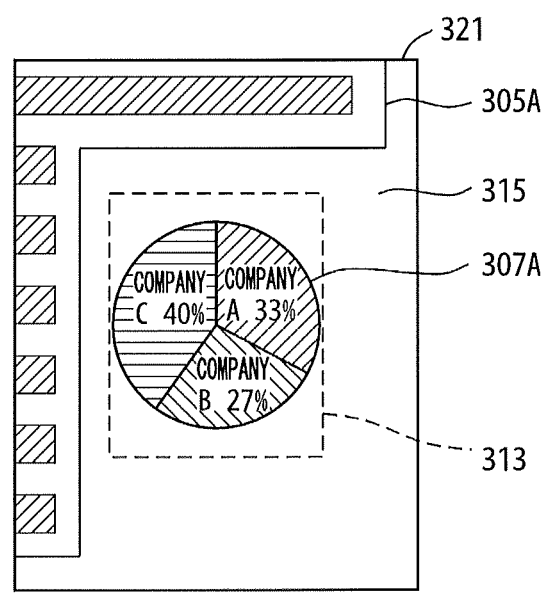
FIG. 11 is a diagram showing an example of a combined image.

FIG. 11 is a diagram showing an example of a combined image. A combined image 321 shown in FIG. 11 is displayed as a preview image when the enlargement operation is accepted and when cut region 301A is determined after preview image 301 shown in FIG. 9 is displayed on LCD 165. Combined image 321 includes, in a region of interest 313, a portion 307A corresponding to a region of interest of the second display image that is generated from appli data 95, and includes, in a peripheral region 315, a portion 305A corresponding to a peripheral region of the second display image that is generated from reduced image data 93. Portion 307A included in region of interest 313 includes the values of the circle graph, which are not included in preview image 301 shown in FIG. 9. Portion 305A included in peripheral region 315 is an image obtained by enlarging character region 305 included in preview image 301 shown in FIG. 9, and the characters in portion 305A cannot be recognized as is the case with preview image 301 shown in FIG. 9.

<Second Modification>

Figure 12:
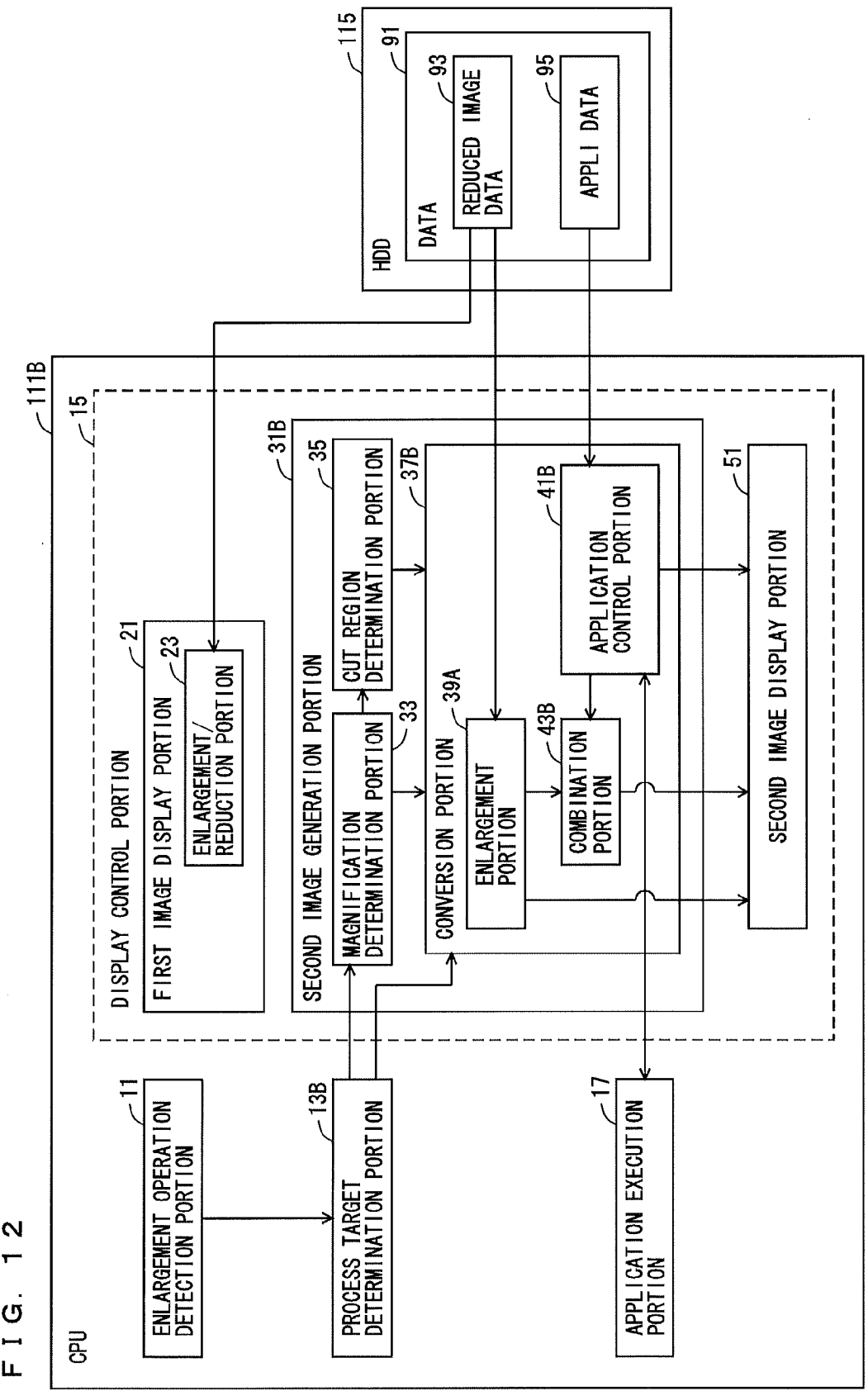
FIG. 12 is a block diagram showing an example of functions of a CPU of an MFP in a second modification, with data stored in the HDD.

FIG. 12 is a block diagram showing an example of functions of a CPU of an MFP, with data stored in the HDD in a second modification. The functions shown in FIG. 12 are implemented by a CPU 111B when CPU 111B of an MFP 100B in the second modification executes a display control program stored in ROM 113, HDD 115, or CD-ROM 118.

The functions in FIG. 12 are different from the functions shown in FIG. 6 in that process target determination portion 13A, second image generation portion 31A, conversion portion 37A, combination portion 43A, and application control portion 41A are changed to a process target determination portion 13B, a second image generation portion 31B, a conversion portion 37B, a combination portion 43B, and an application control portion 41B, respectively. Other functions are the same and a description thereof is therefore not repeated here.

Process target determination portion 13B determines process target data from reduced image data 93 and appli data 95 included in data 91 set as a process target, based on the amount of operation input from enlargement operation detection portion 11. Specifically, process target determination portion 13B determines reduced image data 93 as process target data when the amount of operation is equal to or smaller than the first threshold value. When the amount of operation is greater than the first threshold value and is equal to or smaller than a second threshold value greater than the first threshold value, process target determination portion 13B determines appli data 95 as process target data for the region of interest and determines reduced image data 93 for the peripheral region excluding the region of interest. When the amount of operation is greater than the second threshold value, process target determination portion 13B determines appli data 95 as process target data. Process target determination portion 13B outputs the data identification information for identifying the determined process target data, the amount of operation, and a conversion signal to second image generation portion 31B. When the amount of operation is equal to or smaller than the first threshold value, the conversion signal includes an instruction to select reduced image data 93. When the amount of operation is greater than the first threshold value and is equal to or smaller than the second threshold value, the conversion signal includes an instruction to select reduced image data 93 and appli data 95. When the amount of operation is greater than the second threshold value, the conversion signal includes an instruction to select appli data 95.

Second image generation portion 31B generates a second display image by enlarging or reducing an image of process target data specified by the data identification information input from process target determination portion 13B, to the same display size as the enlarged image obtained by enlarging the first display image at the magnification set based on the amount of operation input from process target determination portion 13B. Second image generation portion 31B outputs the generated second display image to second image display portion 51.

When the conversion signal input from process target determination portion 13A includes an instruction to select reduced image data 93, enlargement portion 39A generates a second display image based on reduced image data 93 and outputs the second display image to second image display portion 51. When the conversion signal input from process target determination portion 13A includes an instruction to select reduced image data 93 and appli data 95, enlargement portion 39A generates a portion corresponding to the peripheral region of the second display image based on reduced image data 93 and outputs the portion corresponding to the peripheral region of the second display image to combination portion 43B.

Application control portion 41B controls application execution portion 17 to allow application execution portion 17 to execute an application program for use with appli data 95 and allow application execution portion 17 to generate an image of appli data 95. Application control portion 41B receives data identification information and a conversion signal from process target determination portion 13, a magnification from magnification determination portion 33, and a cut region from cut region determination portion 35.

When the conversion signal input from process target determination portion 13B includes an instruction to select reduced image data 93 and appli data 95, application control portion 41B obtains a partial magnification for enlarging or reducing an image of appli data 95 to the same size as the enlarged image, before allowing application execution portion 17 to generate an image of appli data 95, and allows application execution portion 17 to generate only a portion corresponding to the region of interest in the image of appli data 95. Then, application control portion 41 sets an image obtained by enlarging or reducing the generated image at the partial magnification, as a portion corresponding to the region of interest of the second display image. Application control portion 41B outputs the generated second display image to combination portion 43B. It is also possible to allow application execution portion 17 to generate an image of appli data 95, to generate an image by enlarging or reducing the generated image of appli data 95 to the same display size as the enlarged image, and to set a portion corresponding to the region of interest in the generated image, as a portion corresponding to the region of interest of the second display image.

When the conversion signal input from process target determination portion 13B includes an instruction to select appli data 95, application control portion 41B reads out appli data 95 included in data 91 stored in HDD 115, outputs the read appli data 95 to application execution portion 17, and allows application execution portion 17 to generate an image of appli data 95. Application control portion 41B generates a second display image based on the image of appli data 95 generated by application execution portion 17 and outputs the generated second display image to second image display portion 51. When a cut region is input from cut region determination portion 35, application control portion 41B obtains a partial magnification for enlarging or reducing an image of appli data 95 to the same display size as the enlarged image, before allowing application execution portion 17 to generate an image of appli data 95, and allows application execution portion 17 to generate only a portion corresponding to the cut region in the image of appli data 95. Then, application control portion 41 sets an image obtained by enlarging or reducing the generated image at the partial magnification, as a second display image. It is also possible to allow application execution portion 17 to generate an image of appli data 95, to generate an image by enlarging or reducing the generated image of appli data 95 to the same display size as the enlarged image, and to set a portion corresponding to the cut region in the generated image as a second display image.

When the conversion signal including an instruction to select reduced image data 93 and appli data 95 is input from process target determination portion 13B, combination portion 43B receives a portion corresponding to the peripheral region of the second display image from enlargement portion 39A and a portion corresponding to the region of interest of the second display image from application control portion 41B. Combination portion 43B generates an image by combining the portion corresponding to the peripheral region of the second display image that is input from enlargement portion 39A and the portion corresponding to the region of interest of the second display image that is input from application control portion 41B together, and outputs the generated image as a second display image to second image display portion 51.

Figure 13:
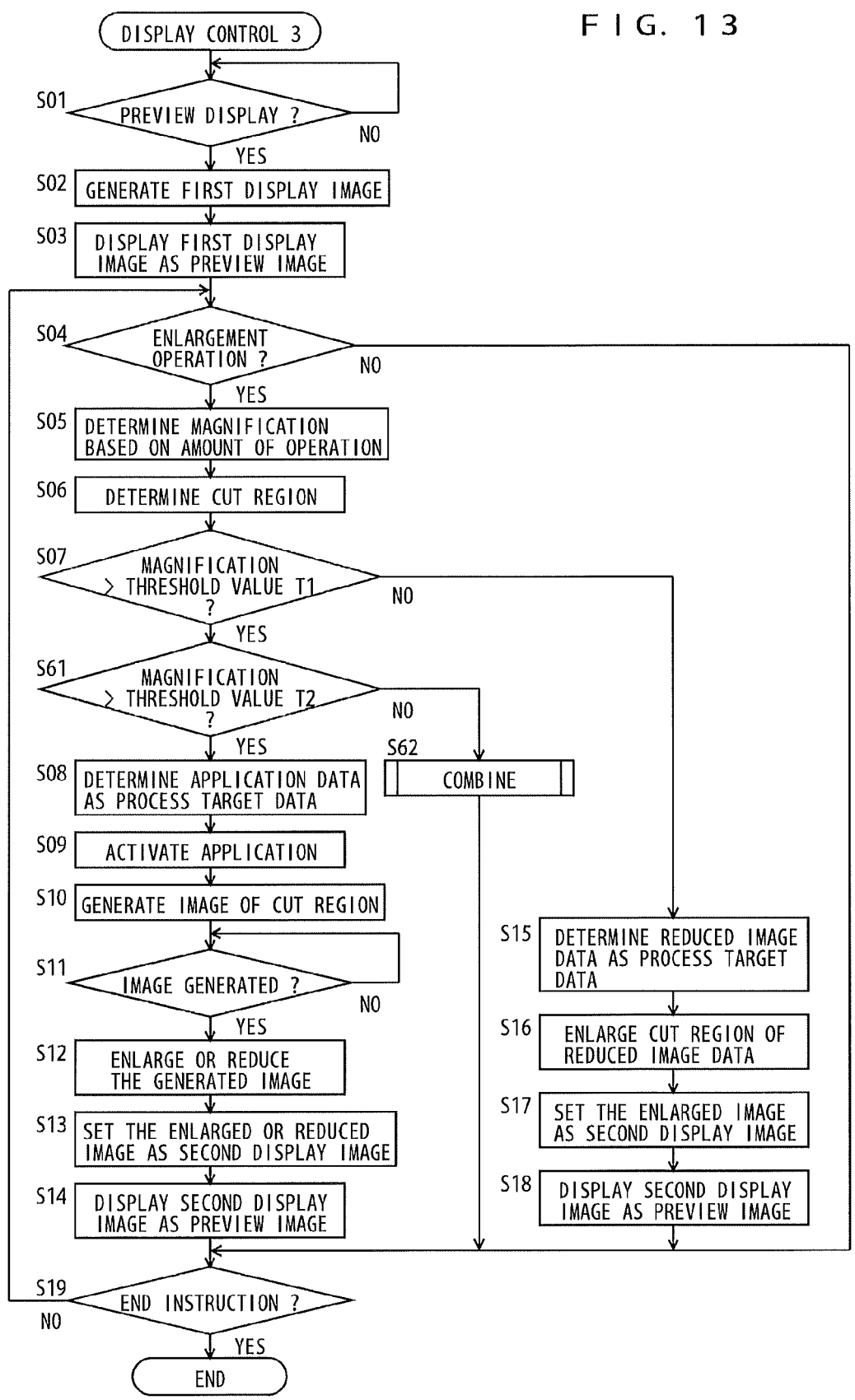
FIG. 13 is a flowchart showing an exemplary flow of a display control process in the second modification.

FIG. 13 is a flowchart showing an exemplary flow of a display control process in the second modification. Referring to FIG. 13, the display control process in the second modification is different from the display control process shown in FIG. 5 in that steps S61 and S62 are added. Other process is the same as the process shown in FIG. 5 and a description thereof is therefore not repeated here.

In step S61, the magnification determined in step S05 is compared with a threshold value T2. The process branches based on the comparison result. The threshold value T2 is a value greater than the first threshold value T1. If the magnification is greater than the threshold value T2, the process proceeds to step S08. If the magnification is equal to or smaller than the threshold value T2, the process proceeds to step S62.

Specifically, in the display control process in the second modification, if the magnification determined in step S05 is greater than the threshold value T2, steps S08 to S14 are executed. If the magnification is greater than the first threshold value T1 and is equal to or smaller than the threshold value T2, step S62 is executed. If the magnification is equal to or smaller than threshold value T1, steps S15 to S18 are executed.

The process in steps S08 to S14 and steps S15 to S18 is the same as the process shown in FIG. 5. In step S62, the combination process shown in FIG. 8 is executed. Therefore, the description is not repeated here.

As described above, MFP 100 in the present embodiment initially displays a first display image generated from reduced image data 93 as a preview image, upon acceptance of an enlargement operation, determines one of reduced image data 93 and application data 95 as process target data based on a magnification set based on the amount of operation of the enlargement operation, generates a second display image based on the process target data, and displays the second display image as a preview image.

When the magnification is low, enlarging the reduced image data less degrades the image quality. Therefore, the reduced image data is enlarged, thereby giving priority to the display speed. Thus, the time taken to display a preview image can be shortened. On the other hand, when the magnification is high, enlarging the reduced image data degrades the image quality considerably. Therefore, priority is given to image quality and an image with a high resolution is displayed by setting an image obtained by enlarging or reducing application data as a preview image. Therefore, when the magnification is equal to or smaller than the first threshold value, the reduced image data is determined as process target data, thereby giving priority to the display speed. When the magnification is greater than the first threshold value, the application data is determined as process target data, thereby giving priority to the image quality. As a result, either the display speed or the image quality is given priority in accordance with the user's operation.

The image of process target data is enlarged or reduced to the same display size as the enlarged image obtained by enlarging the first display image at the magnification determined based on the amount of operation. The user views the preview image on LCD 165 while inputting an enlargement operation. As a result, the enlarged image of the portion corresponding to the user's operation can be displayed in the preview image.

A cut region having the same display size as the preview image is determined in the enlarged image obtained by enlarging the first display image at the magnification set based on the amount of operation, and a second display image is generated based on a portion corresponding to the cut region of the process target data. Therefore, the amount of data is reduced because the amount of data to be processed is limited to the portion corresponding to the cut region. Thus, the time taken to display a preview image can be shortened. In addition, the size of the preview image on LCD 165 can be kept constant because the second display image is displayed in place of the first display image.

An enlargement operation is detected when two different positions are detected simultaneously by touch panel 169 and the distance between the two positions continuously detected is changed over time. Then, the amount of operation is determined based on the amount of change in distance between the two positions. Therefore, the user can input an enlargement or reduction operation with pinch-out or pinch-in operation, that is, the operation of changing the distance between two positions designated with two fingers on touch panel 169. This facilitates an enlargement or a reduction operation.

In response to that two different positions simultaneously detected by touch panel 169 stop being detected, the amount of change is determined based on the two positions last detected. Therefore, the user can input the amount of operation with a simple operation of removing the fingers from touch panel 169.

MFP 100 in the first modification determines the reduced image data as process target data when the magnification set based on the amount of operation in an enlargement operation is equal to or smaller than the first threshold value. When the magnification is greater than the first threshold value, MFP 100 determines the application data as process target data for a predetermined region of interest of the second display image and determines the reduced image data as process target data for the peripheral region of the second display image. When the magnification is low, priority can be given to the display speed because enlarging the reduced image data less degrades the image quality. On the other hand, when the magnification is high, enlarging the reduced image data degrades the image quality considerably. However, in many cases, the portion to be checked by the user is only part of the preview image. Therefore, an image obtained by enlarging the reduced image data is set for the peripheral region while an image obtained by enlarging or reducing the application data is set for the region of interest. In this way, the amount of data processed in the application data can be minimized. As a result, the image quality of the region of interest is not degraded while the display speed can be maximized.

MFP 100 in the second modification determines the reduced image data as process target data when the magnification set based on the amount of operation of an enlargement operation is equal to or smaller than the first threshold value. When the magnification is greater than the first threshold value and is equal to or smaller than the second threshold value, MFP 100 determines the application data as process target data for the region of interest and determines the reduced image data as process target data for the peripheral region. When the magnification is greater than the second threshold value, MFP 100 determines application data as process target data. When the magnification is low, enlarging the reduced image data less degrades the image quality, thereby giving priority to the display speed. On the other hand, when the magnification is intermediate, enlarging the reduced image data degrades the image quality considerably. However, in many cases, the portion to be checked by the user is only part of the preview image. Therefore, an image obtained by enlarging the reduced image data is set for the peripheral region while an image obtained by enlarging or reducing the application data is set for the region of interest, so that the amount of data to be processed in the application data can be minimized. On the other hand, when the magnification is high, the range of the portion to be checked by the user is often large. Therefore, an image obtained by enlarging or reducing the application data is set as a preview image, thereby giving priority to the image quality.

In the foregoing embodiment, MFP 100 has been described as an example of a display control apparatus. However, it is needless to say that the present invention can be understood as a display control method that allows MFP 100 to execute the display control process shown in FIG. 5, FIG. 7 or FIG. 13, or a display control program for allowing CPU 111 controlling MFP 100 to execute the display control method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image display apparatus comprising:
   a storage portion to store application data and reduced image data obtained by reducing an image of said application data, in association with each other;
   a display portion to display a preview image;
   a position detection portion to detect a position designated by the user on a display surface of said display portion;
   an enlargement operation detection portion to detect an enlargement operation of giving an instruction to enlarge a preview image when two different positions are detected simultaneously by said position detection portion and a distance between the two positions continuously detected by said position detection portion is changed over time;
   a first image display portion to display a first display image generated from said reduced image data as said preview image on said display portion;
   a process target determination portion to determine the amount of operation of the enlargement operation based on the amount of change in said distance between the two positions detected by said enlargement operation detection portion, and to determine process target data from said reduced image data and said application data associated with said reduced image data, based on a magnification set by said amount of operation;
   a second display image generation portion to generate a second display image based on said determined process target data, in response to said enlargement operation being detected; and a second image display portion to display said generated second display image as said preview image on said display portion, wherein
if the magnification set by said amount of operation is greater than a first threshold value and is equal to or smaller than a second threshold value greater than the first threshold value, said process target determination portion further determines said application data as process target data for a region of interest and determines said reduced image data as process target data for a peripheral region excluding said region of interest of an image of said process target data; and
if the magnification set by said amount of operation is greater than the second threshold value, said process target determination portion determines said application data as process target data.

2. The image display apparatus according to claim 1, wherein said second display image generation portion includes
a magnification determination portion to determine the magnification based on said amount of operation, and
a conversion portion to enlarge or reduce an image of said determined process target data to a same display size as an enlarged image obtained by enlarging said first display image at said determined magnification.

3. The image display apparatus according to claim 1, wherein
said second image generation portion includes a cut region determination portion to determine a cut region having a same display size as said preview image in an enlarged image obtained by enlarging said first display image at the magnification set based on the amount of operation,
said second image generation portion generates the second display image based on a portion corresponding to said determined cut region of said determined process target data, and
said second image display portion displays said second display image in place of said displayed first display image.

4. The image display apparatus according to claim 1, wherein in response to that different two positions simultaneously detected by said position detection portion stop being detected, said process target determination portion determines said amount of change based on two positions last detected.

5. The image display apparatus according to claim 1, wherein the second image display portion is configured to display said generated second display image as said preview image on said display portion to replace said first display image.

6. The image display apparatus according to claim 1, wherein when said process target determination portion determines said application data as said process target data, said second display image generation portion generates said display image by executing an application program corresponding to said application data.

7. An image display apparatus comprising:
a storage portion to store application data and reduced image data obtained by reducing an image of said application data, in association with each other;
a display portion to display a preview image;
a position detection portion to detect a position designated by the user on a display surface of said display portion;
an enlargement operation detection portion to detect an enlargement operation of giving an instruction to enlarge a preview image when two different positions are detected simultaneously by said position detection portion and a distance between the two positions continuously detected by said position detection portion is changed over time;
a first image display portion to display a first display image generated from said reduced image data as said preview image on said display portion;
a process target determination portion to determine the amount of operation of the enlargement operation based on the amount of change in said distance between the two positions detected by said enlargement operation detection portion, and to determine process target data from said reduced image data and said application data associated with said reduced image data, based on a magnification set by said amount of operation;
a second display image generation portion to generate a second display image based on said determined process target data, in response to said enlargement operation being detected; and
a second image display portion to display said generated second display image as said preview image on said display portion, wherein
if the magnification set by said amount of operation is equal to or smaller than a first threshold value, said process target determination portion determines said reduced image data as process target data; and if the magnification set by said amount of operation is greater than the first threshold value, said process target determination portion determines said application data as process target data for a predetermined region of interest of said second display image and determines said reduced image data as process target data for a peripheral region excluding said region of interest of said second display image.

8. The image display apparatus according to claim 7, wherein
if the magnification set by said amount of operation is greater than the first threshold value and is equal to or smaller than a second threshold value greater than the first threshold value, said process target determination portion further determines said application data as process target data for a region of interest and determines said reduced image data as process target data for a peripheral region excluding said region of interest of an image of said process target data; and if the magnification set by said amount of operation is greater than the second threshold value, said process target determination portion determines said application data as process target data.

9. A display control method performed in an image display apparatus,
said image display apparatus including
a storage portion to store application data and reduced image data obtained by reducing an image of said application data, in association with each other,
a display portion to display an image, and
a position detection portion to detect a position designated by a user on a display surface of said display portion,
said display control method comprising:
a detection step of detecting an enlargement operation of giving an instruction to enlarge an image when two different positions are detected simultaneously by said position detection portion and a distance between the two positions continuously detected by said position detection portion is changed over time;

a first display step of displaying said reduced image data as a first display image on said display portion;

a determination step of determining the amount of operation of the enlargement operation based on the amount of change in said distance between the two positions detected in said detection step, determining said reduced image data as process target data if the magnification set by said amount of operation is equal to or smaller than a first threshold value, and determining said application data as process target data for a predetermined region of interest of said second display image and determining said reduced image data as process target data for a peripheral region excluding said region of interest of said second display image, if the magnification set by said amount of operation is greater than the first threshold value;

a generation step of, in response to said enlargement operation being detected, generating, as a second display image, at least part of an image obtained by enlarging or reducing said determined process target to an enlarged display size of said first display image at a magnification set based on said amount of operation; and a second display step of displaying said generated second display image.

10. A non-transitory computer-readable recording medium encoded with a display control program executed by a computer controlling an image display apparatus, wherein the display control program causes the computer to perform each step of the display control method according to claim 9.

11. The display control program according to claim 10, wherein said generation step includes the steps of:

determining a magnification based on said amount of operation; and enlarging or reducing an image of said determined process target data to a same display size as an enlarged image obtained by enlarging said first display image at said determined magnification.

12. The display control program according to claim 10, wherein said determination step includes the steps of:

determining said reduced image data as said process target data if the magnification set by said amount of operation is equal to or smaller than a first threshold value; and determining said application data as process target data if said amount of operation is greater than the first threshold value.

13. The display control program according to claim 10, wherein said generation step includes:

a cut region determination step of determining a cut region having a same display size as said preview image in an enlarged image obtained by enlarging said first display image at the magnification set based on the amount of operation; and a step of generating a second display image based on a portion corresponding to said determined cut region of said determined process target data, and said second display step includes a step of displaying said second display image in place of said displayed first display image.

14. The display control program according to claim 10, wherein in response to that different two positions simultaneously detected by said position detection portion stop being detected, said determination step determines said amount of change based on two positions last detected.

15. A display control method performed in an image display apparatus, said image display apparatus including a storage portion to store application data and reduced image data obtained by reducing an image of said application data, in association with each other, a display portion to display an image, and a position detection portion to detect a position designated by a user on a display surface of said display portion, said display control method comprising:

a detection step of detecting an enlargement operation of giving an instruction to enlarge an image when two different positions are detected simultaneously by said position detection portion and a distance between the two positions continuously detected by said position detection portion is changed over time;

a first display step of displaying said reduced image data as a first display image on said display portion;

a determination step of determining the amount of operation of the enlargement operation based on the amount of change in said distance between the two positions detected in said detection step, determining said reduced image data as process target data if the magnification set by said amount of operation is equal to or smaller than a first threshold value;

determining said application data as process target data for a region of interest and determining said reduced image data as process target data for a peripheral region excluding said region of interest of an image of said process target data, if the magnification set by said amount of operation is greater than the first threshold value and is equal to or smaller than a second threshold value greater than the first threshold value; and determining said application data as process target data if the magnification set by said amount of operation is greater than the second threshold value;

a generation step of, in response to said enlargement operation being detected, generating, as a second display image, at least part of an image obtained by enlarging or reducing said determined process target to an enlarged display size of said first display image at a magnification set based on said amount of operation; and a second display step of displaying said generated second display image.

16. A non-transitory computer-readable recording medium encoded with a display control program executed by a computer controlling an image display apparatus, wherein the display control program causes the computer to perform each step of the display control method according to claim 15.

* * * * *